June 22, 1926.

J. E. SHAW 1,589,487

WATER FEED FOR ROCK DRILLS

Filed July 28, 1925

INVENTOR
John E. Shaw
BY
ATTORNEY

Patented June 22, 1926.

1,589,487

UNITED STATES PATENT OFFICE.

JOHN E. SHAW, OF MURPHY, CALIFORNIA.

WATER FEED FOR ROCK DRILLS.

Application filed July 28, 1925. Serial No. 46,559.

This invention relates to improvements in rock drills and particularly to the manner of feeding water to the drill.

As usually constructed the water is fed into the machine at the rear end thereof, passing through all the parts to the chuck at the head end, and thence to the drill by means of a long needle-like nozzle or tube which projects into the drill. Owing to the necessarily small diameter of this tube and its relatively great length, it is continuously breaking, owing to the severe vibration had with the operation of the machine.

When this occurs drilling operations must be stopped until the machine can be dismantled to the extent necessary to make repairs.

The principal object of my invention therefore is to eliminate such trouble by arranging for the feeding of the water to the drill from a point adjacent the chuck instead of entirely through the body of the machine. This enables a very short nozzle to be used, and consequently lessens the liability of breakage to a very great extent.

In doing this it is not necessary to alter the standard arrangement of parts of the drilling machine.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
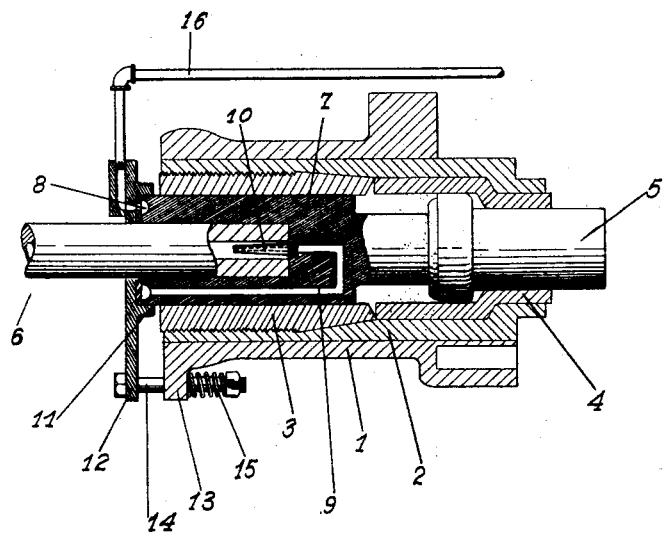
Fig. 1 is a sectional elevation of the chuck end of a drilling machine, showing my water feed arrangement incorporated therewith.
Figure 2:
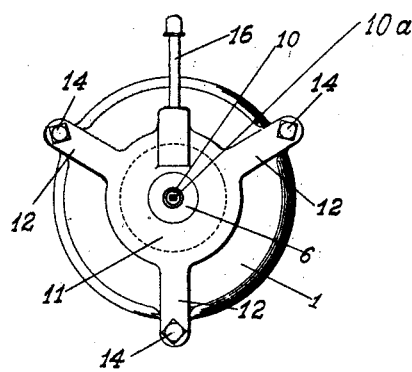
Fig. 2 is an end view of the device.

Referring now more particularly to the characters of reference on the drawings, the numeral 1 denotes the usual outer chuck sleeve of the machine in which is mounted the tappet chuck 2. In this chuck, in longitudinally spaced relation, are mounted the drill chuck 3 and the tappet bushing 4 respectively. The tappet 5 is slidably mounted in the bushing 4.

In the usual construction of such drills, the drill 6 is mounted directly in the chuck 3, but in incorporating my invention with the above described standard parts, I make the same somewhat larger in diameter so that there will be considerable clearance between the drill and the chuck.

My invention comprises what I term a false chuck 7, which is mounted in the chuck 3. The outer end of the chuck 7 has a blind socket to receive the adjacent end of a drill, the inner end of the chuck 7 being engaged by the tappet 5.

The outer face of the chuck 7 has a continuous groove 8 there-around from which a water passage 9 leads inwardly of the chuck to a termination at the bottom of the socket therein and centrally thereof. A short nozzle or water tube 10 is mounted in connection with the inner end of the passage 9 and projects through the hollow drill in the customary manner.

A cap 11 is mounted over the outer face of the chuck 7 so as to make the groove 8 a water-tight enclosure. To hold the cap stationary, so that it will not rotate with the chuck, arms 12 project radially from said cap to a point beyond the outer periphery of the sleeve 1. The latter has lugs 13 alined with said arms and bolts 14 passed through the lugs and arms. A compression spring 15 is preferably mounted about the bolts beyond the lugs so as to maintain the cap 11 in constant engagement with the chuck 7, so as to take up any wear as it occurs and maintain a water-tight fit between the parts at all times.

A water supply pipe or hose 16 is attached to the cap 11 so as to feed water to the groove 8, from which said water will of course travel along the passage 9 to the nozzle 10 and thence through the drill, as is required.

The hole $10^a$ of the nozzle 10 is made square to receive a square punch or rod whereby the nozzle can be screwed to place. The pitch of the threads on the nozzle will be arranged opposite to the way the drill turns i. e. if the drill turns to the right the nozzle will have left hand threads and vice versa so that when the drill turns the nozzle will not unscrew.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A water feed means for rock drilling machines comprising a chuck member turnably mounted in the machine at the head end thereof to receive the shank of a drill, passage means from the drill inwardly of the chuck to the outer end of said chuck, a stationary member over the outer end of the chuck, a water supply member attached to said stationary member, and means whereby water fed to said stationary member will be passed into said passage means regardless of the rotation of the chuck.

2. A structure as in claim 1, in which said means comprises a continuous groove in the outer face of the chuck and with which the passage means and water supply member communicate, said stationary member having a water tight fit with the cap.

3. A water feed means for rock drilling machines comprising a chuck member turnably mounted in the machine at the head end thereof to receive the shank of a drill, passage means from the drill inwardly of the chuck to the outer end of said chuck, a cap over the end of the chuck, means for mounting said cap onto the machine in a manner to maintain the cap stationary relative to the chuck and to have a water-tight engagement therewith, a water supply pipe attached to the cap, and means whereby water fed to the cap through said pipe will be passed to the passage means regardless of the rotation of the chuck.

In testimony whereof I affix my signature.

JOHN E. SHAW.